United States Patent [19]
Howard et al.

[11] Patent Number: 5,903,247
[45] Date of Patent: May 11, 1999

[54] SERVO CONTROLLED LIQUID CRYSTAL WINDOWS

[75] Inventors: Dwight L. Howard, Winters; Chris A. Johnson, Davis, both of Calif.

[73] Assignee: The Regents of the University of California, Oakland, Calif.

[21] Appl. No.: 08/684,681

[22] Filed: Jul. 19, 1996

[51] Int. Cl.$^6$ ........................................ G09G 3/36
[52] U.S. Cl. .................... 345/87; 345/207; 349/16; 250/205
[58] Field of Search ..................... 345/103, 104, 345/207, 87; 349/13, 16, 61–72; 362/29, 30; 250/205, 201.1

[56] References Cited

U.S. PATENT DOCUMENTS

| | | |
|---|---|---|
| H737 | 2/1990 | Rushford . |
| 3,976,361 | 8/1976 | Fraas et al. . |
| 4,039,803 | 8/1977 | Harsch . |
| 4,456,335 | 6/1984 | Mumford . |
| 4,475,031 | 10/1984 | Mockovciak, Jr. ...................... 349/16 |
| 4,688,895 | 8/1987 | Jacob ...................................... 349/16 |
| 4,726,660 | 2/1988 | Rushford . |
| 4,749,257 | 6/1988 | Klausz . |
| 4,846,559 | 7/1989 | Kniffler . |
| 4,920,257 | 4/1990 | Furthbauer et al. ............... 250/201.01 |
| 5,152,111 | 10/1992 | Baughman et al. . |
| 5,170,271 | 12/1992 | Lackner et al. . |
| 5,172,256 | 12/1992 | Sethofer et al. . |
| 5,173,342 | 12/1992 | Sato et al. . |
| 5,208,688 | 5/1993 | Fergason et al. . |
| 5,252,817 | 10/1993 | Fergason et al. ....................... 250/205 |
| 5,377,032 | 12/1994 | Fergason et al. . |
| 5,654,736 | 8/1997 | Green et al. ............................... 349/16 |

OTHER PUBLICATIONS

Ivanov, "Economical Two–Frequency Control Circuit for High Speed Liquid–Crystal Electrooptic Shutter," 1991 Plenum Publishing Corporation, pp. 474–476.

Rynders et al., "Single–Channel Sinusoidally Modulated Visual Signal Generator with Variable Temporal Contrast," 1993 Optical Society of America, J. Opt. Soc. Am., No. 7, pp. 1642–1650.

Primary Examiner—Steven J. Saras
Assistant Examiner—Amr A. Awad
Attorney, Agent, or Firm—John P. O'Banion

[57] ABSTRACT

An apparatus for controlling the opacity of a liquid-crystal window, having a light emitter positioned adjacent to one side of the liquid-crystal window, a light detector positioned adjacent to the opposite side of the liquid-crystal window, and a differential amplifier/driver that compares the output of the light detector with an input control signal and generates a differential drive signal to vary the opacity of said liquid-crystal window.

10 Claims, 5 Drawing Sheets

SERVO CONTROLLED LIQUID CRYSTAL WINDOWS

BACKGROUND OF THE INVENTION

1. Field of the Invention

This invention pertains generally to devices for controlling light intensity, and more particularly to a servo-control apparatus for liquid crystal windows that allows for continuous and predictable control of optical density.

2. Description of the Background Art

Liquid crystal window (LCW) technology has long been in use for switching a light source on and off. However, while LCWs are well suited to bi-state operation, the non-linearity and temperature dependence of their response does not facilitate repeatable, continuous control of optical density.

Alternative approaches include neutral density wedges. A wedge is a continuously varying neutral density filter which is superimposed on an identical wedge with a reversed density slope. The density of the superimposed area is thus flat, and is varied by mechanically sliding one or both wedges in opposite directions. However, wedges are slow and cumbersome compared to LCWs, and are typically over an order of magnitude more expensive.

Another known approach to continuous optical density control is to employ polarized light and mechanical positioning of optical components. This technique, however, has the same speed limitations and cost differential as the neutral density wedges.

Also, special forms of LCWs called "ferro-liquid crystal" (FLC) windows have been developed. These devices can be pulse-modulated to give a continuous density control. However, they are typically over an order of magnitude more expensive than conventional LCWs.

Therefore, there is a need for a high speed, low cost LCW-based apparatus that provides for repeatable, continuous optical density control. The present invention satisfies those needs, as well as others, and overcomes deficiencies found in prior devices.

SUMMARY OF THE INVENTION

The present invention pertains to a method and apparatus for continuously varying the optical density of an LCW. In general terms, the apparatus automatically measures the optical density of the LCW and applies the resultant signal as feedback. The optical density thus becomes a direct function of the input control voltage, and is predictable and stable. Optical density of the LCW is controlled by manually varying the input voltage, or by using a signal generator or computer to generate an input waveform. Additionally, multiple LCWs can be cascaded to extend the optical density range if desired.

Additionally, the invention permits the accurate control of arbitrary portions of the LCW distal from the feedback area. That is, by monitoring one pattern element of a display, other pattern elements of the same display can be accurately controlled in tandem. The ability to control liquid crystal video display pixels to better than eight bits of resolution becomes possible with the present invention.

The invention replaces more expensive and cumbersome mechanical devices with a compact, electronically controlled LCW. The speed of response and economic savings are both increased by better than an order of magnitude. The invention can be used in place of costly pulse-modulated FLC devices or, if cost is not a factor and if higher frequency modulation is required, the same control method may be applied to the FLC.

By way of example, and not of limitation, in one embodiment of the invention a light emitting diode (LED) is positioned adjacent to one side of an LCW and a photodiode is positioned adjacent to the other side in general alignment with the LED. The output of the photodiode is used for feedback and compared with the input voltage using a differential amplifier. The difference between the input and feedback voltages is amplified and sent to the LCW through a bi-phasic driver that alternates application of the drive voltage and ground potential to the LCW. A phase-lag component is included in the differential amplifier circuit to stop oscillation in the loop and is tuned to optimize the frequency response of the LCW. Low level fluctuations due to asymmetry of the LCW are removed by introducing a bias signal at the positive input of the differential amplifier In another embodiment of the invention, the apparatus is configured for driving an FLC window directly as a servo element for higher frequency operation. If the limited operating temperature range, higher light loss, and higher cost of FLCs is acceptable, the FLC window embodiment provides a faster and simpler alternative to the LCW for temporal intensity modulation.

An object of the invention is to provide for optical density control of an LCW.

Another object of the invention is to provide for continuous optical density control of an LCW.

Another object of the invention is to provide for optical density control of an LCW that is repeatable.

Another object of the invention is to provide an alternative to pulse width modulating an FLC.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
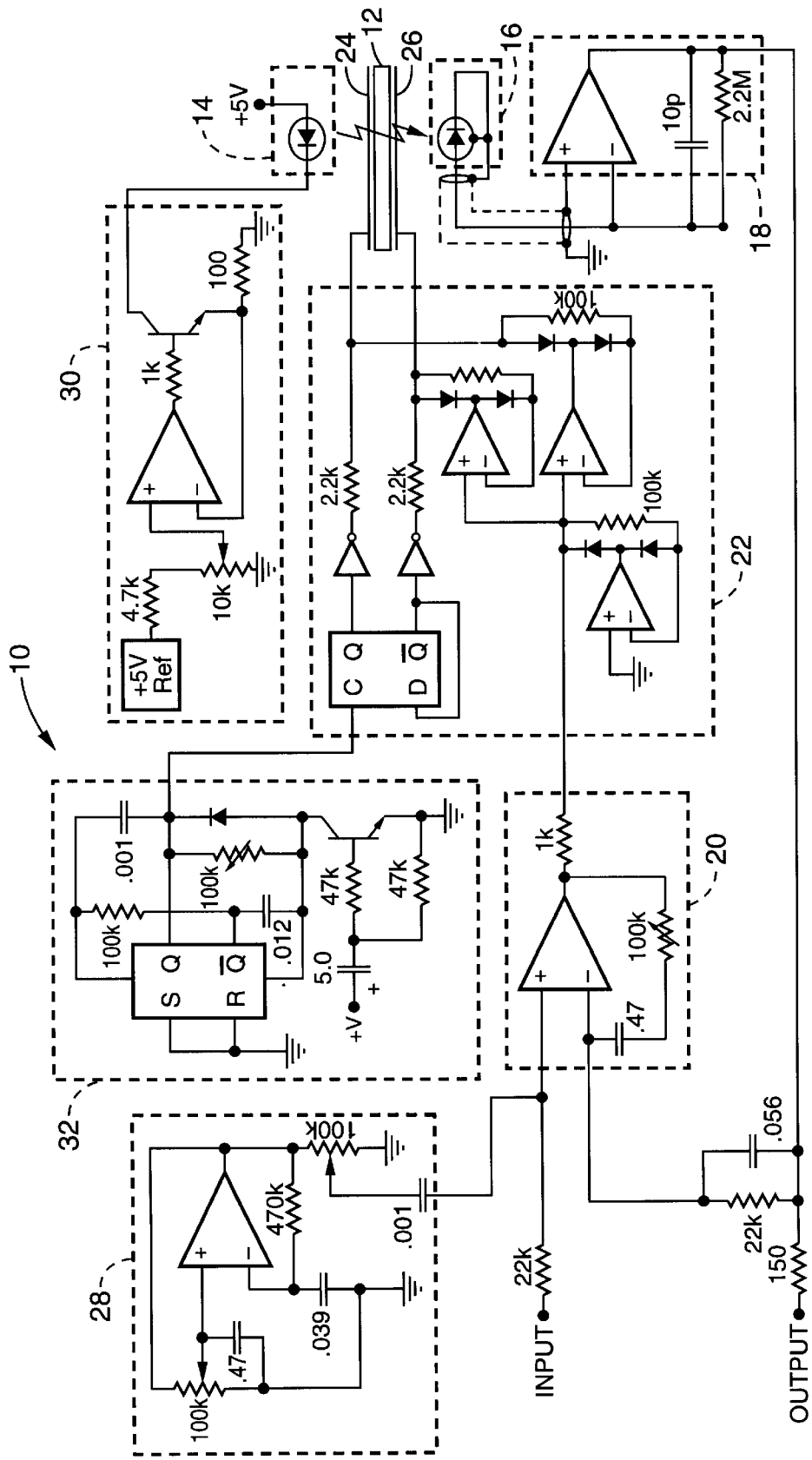
FIG. 1 is a schematic diagram of an apparatus in accordance with the present invention shown connected to a liquid-crystal window.

Referring more specifically to the drawings, for illustrative purposes the present invention is embodied in the apparatus generally shown in FIG. 1 and FIG. 3 where like reference numerals denote like parts, and in the method of controlling a liquid-crystal window described in connection therewith. It will be appreciated that the apparatus may vary as to configuration and as to details of the parts, and that the method may vary as to the details of the steps and their sequence, without departing from the basic concepts as disclosed herein. In addition, those skilled in the art will appreciate that the schematic diagrams presented herein are exemplary and, further, that digital and analog equivalents could be used for the circuit elements shown.

Referring first to FIG. 1, a schematic diagram of a servo-control apparatus 10 for varying the opacity of an LCW 12 in accordance with the present invention is shown. In the embodiment shown, a light emitting diode 14 is positioned adjacent to one side of LCW 12 and a photodiode 16 is positioned adjacent to the other side of LCW 12 and opposing light emitting diode 14.

Photodiode 16 generates an output signal which is responsive to the amount of light from light emitting diode 14 that is transmitted through LCW 12. The output signal from photodiode 16 is amplified by a photodiode amplifier 18, and the resulting amplified signal is compared to the input control voltage using a differential amplifier 20. Hence, the output of photodiode 16 is used as a feedback signal. The difference between the input control voltage and amplified feedback signal is then amplified and sent to LCW 12 through a bi-phasic driver 22. Because a typical liquid crystal window will degrade if a direct current voltage greater than 50 mV is applied across it for extended periods, bi-phasic driver 22 alternates application of the drive voltage and ground potential between electrodes 24, 26. Preferably the drive voltage is applied at a frequency of approximately 500 Hz and the direct current potential across LCW 12 is held to below approximately 35 mV. Note also that a phase-lag component is included in the differential amplifier circuit to stop oscillation in the loop, and is preferably tuned to optimize the frequency response of LCW 12. Further, low level fluctuations due to the extreme rise- and fall-time asymmetry of LCW 12 are removed by introducing a bias signal at the positive input of differential amplifier 20, using a bias oscillator 28. Typically, the bias signal is a 12 kHz signal. Light emitting diode 14 is driven by a constant current source 30 as shown.

Photodiode 16 is typically a flammamatsu G3067 or equivalent, and light emitting diode 14 is typically an HP4101 or equivalent. Note that LCW 12, which is a Standish 930639991104E002 or equivalent, is essentially transparent to infrared radiation even when fully occluded. Therefore, photodiode 16 should be insensitive to the IR region of the spectrum since light emitting diode 14 emits enough IR to mask the LCW occlusion below about one log unit.

Photodiode amplifier 18, differential amplifier 20 and constant current source 30 preferably use low-drift and low-offset operational amplifiers such as an OP400 or equivalent. Bi-phasic driver 22 preferably uses operational amplifiers such as a TL074 or equivalent. The clock circuit 32 preferably uses a 4013 flip-flop or equivalent. Those skilled in the art will recognize that the foregoing components, as well as the other components shown in FIG. 1, are conventional off-the-shelf items.

Figure 2:
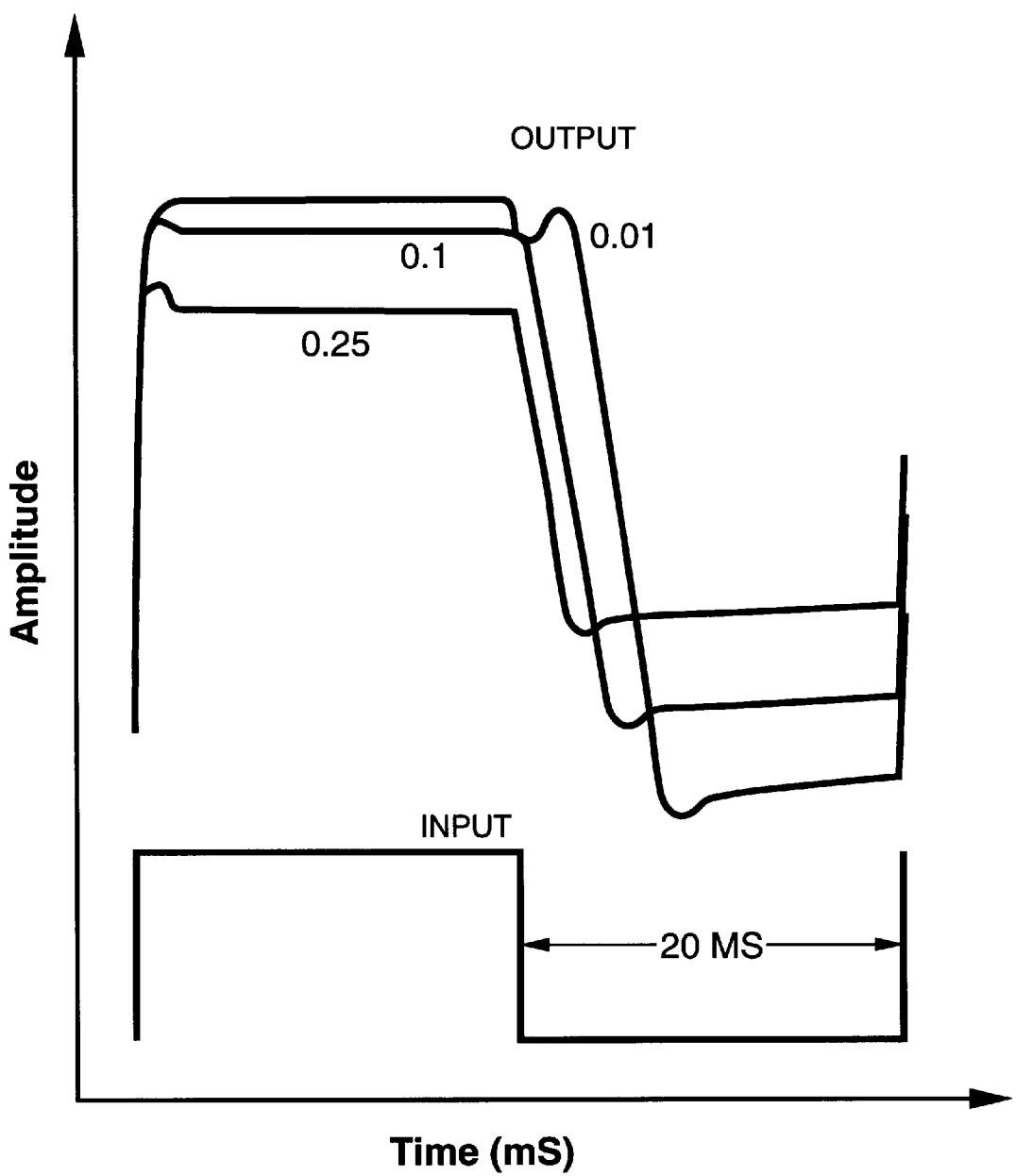
FIG. 2 is a graph showing the typical square wave response of an LCW controlled by the apparatus shown in FIG. 1.

Referring to FIG. 2, the typical square wave response of a servo-controlled liquid-crystal window in accordance with the present invention is shown at different amplitudes, where the numbers in boxes indicate occlusion levels referenced to full scale. In operation, the apparatus can be controlled by manually varying the voltage level of the input control signal, or by using a signal generator or computer to generate an input control signal. Additionally, multiple LCWs can be cascaded to extend the optical density range if desired.

Figure 3:
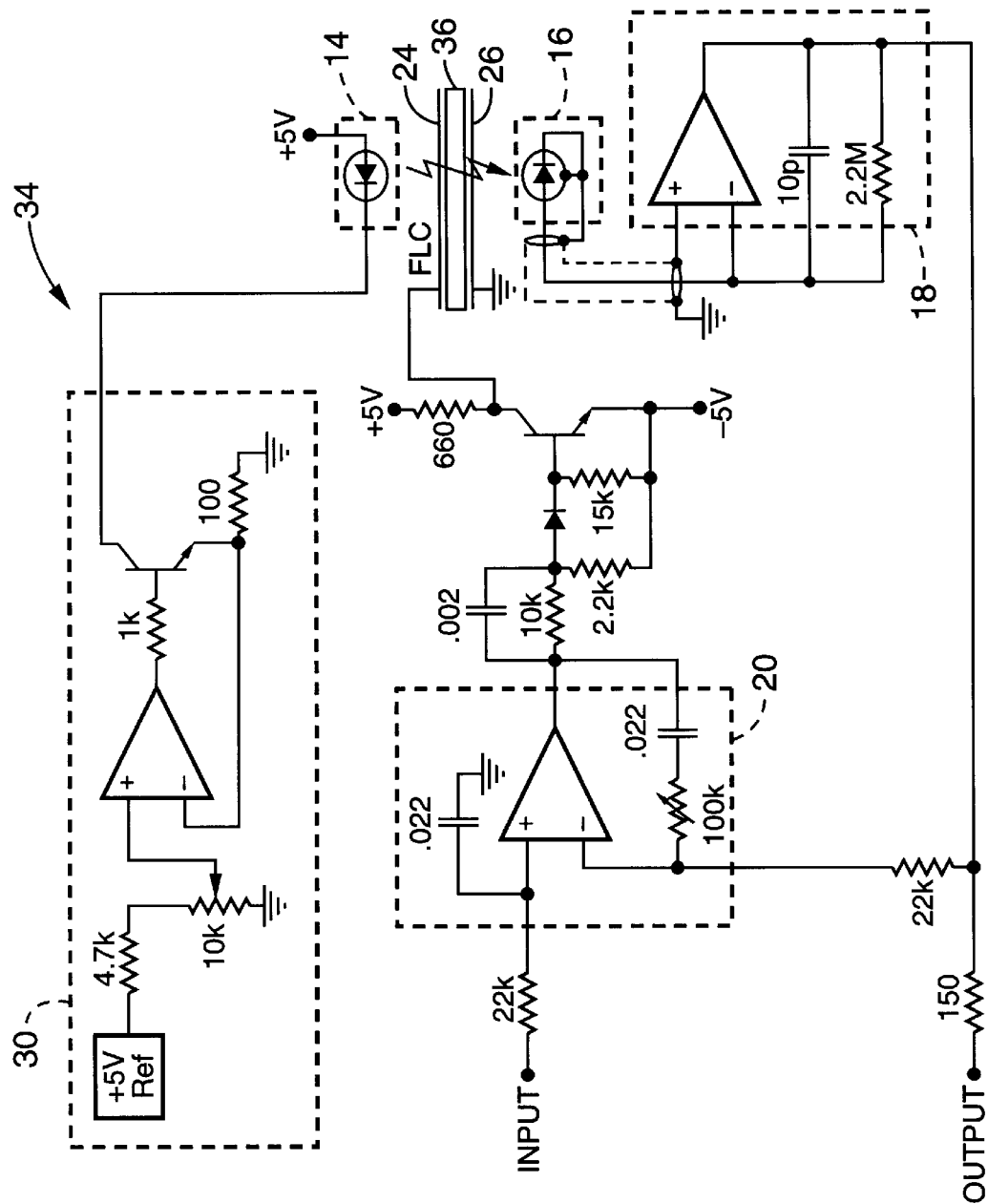
FIG. 3 is a schematic diagram of an alternative embodiment of the apparatus of FIG. 1 shown connected to an FLC window.
Figure 4:
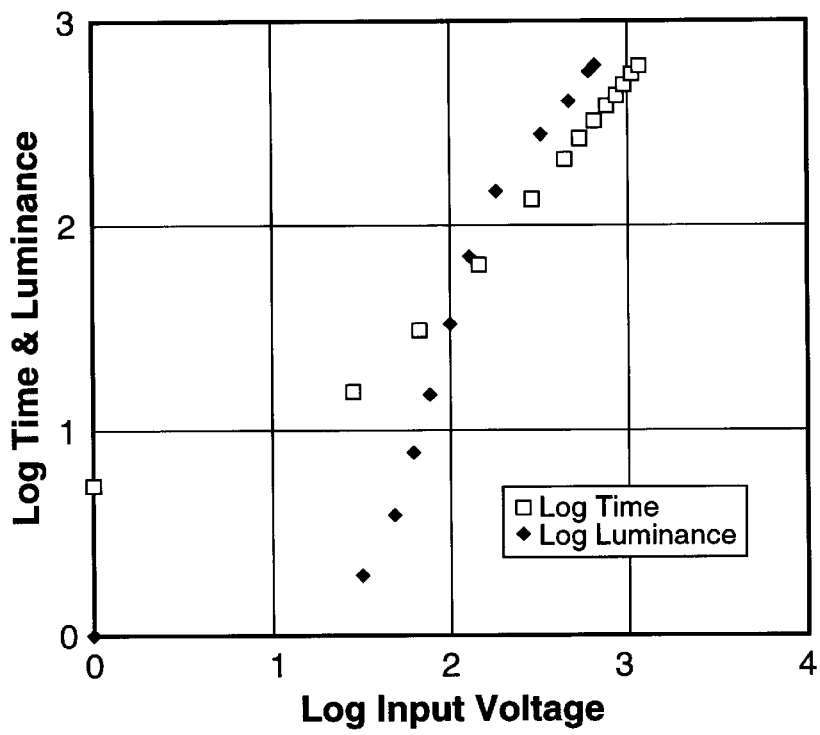
FIG. 4 is a graph showing the typical pulse width modulation characteristics of an FLC window.

Referring now to FIG. 3, an alternative embodiment 34 of the invention is shown. Here, an FLC window 36 is driven directly as a servo element. It will be appreciated, however, that the natural technique for modulating the optical density of such a device is to vary the on- and off-times at a frequency well above the desired optical modulation frequency. For example, FIG. 4 shows a typical plot of the pulse time and the transmission of an FLC window when pulse-width modulated (PWM) a clock frequency of about 1 kHz. As can be seen, the FLC window provides predictable steady-state intensity control over a three log-unit range, and that the modulation frequency response of the PWM scheme is limited by the clock frequency.

Figure 5:
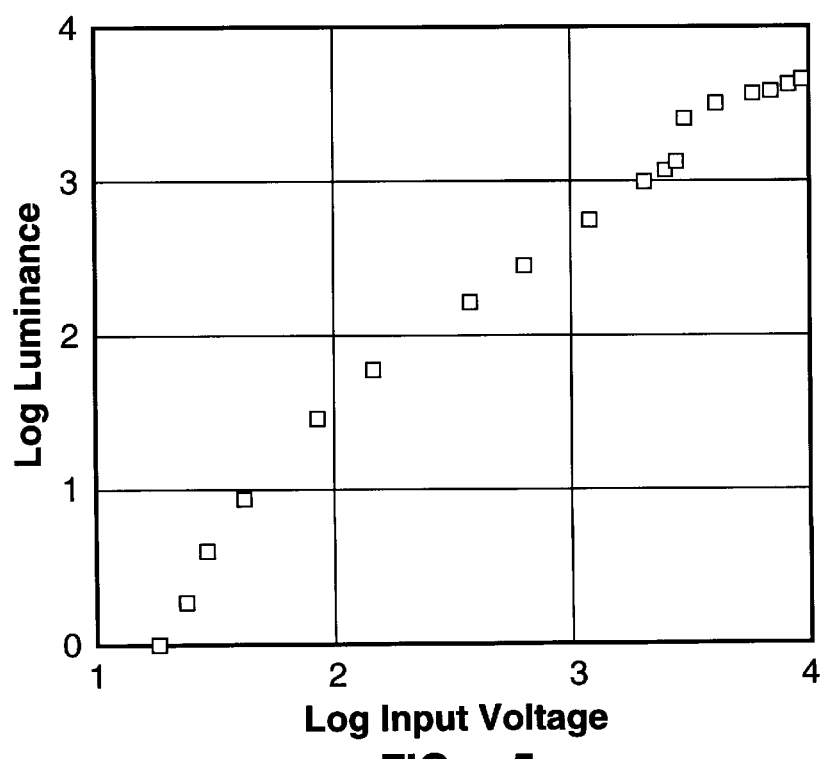
FIG. 5 is a graph showing the typical linearity characteristics of an FLC window controlled by the apparatus shown in FIG. 3.
Figure 6:
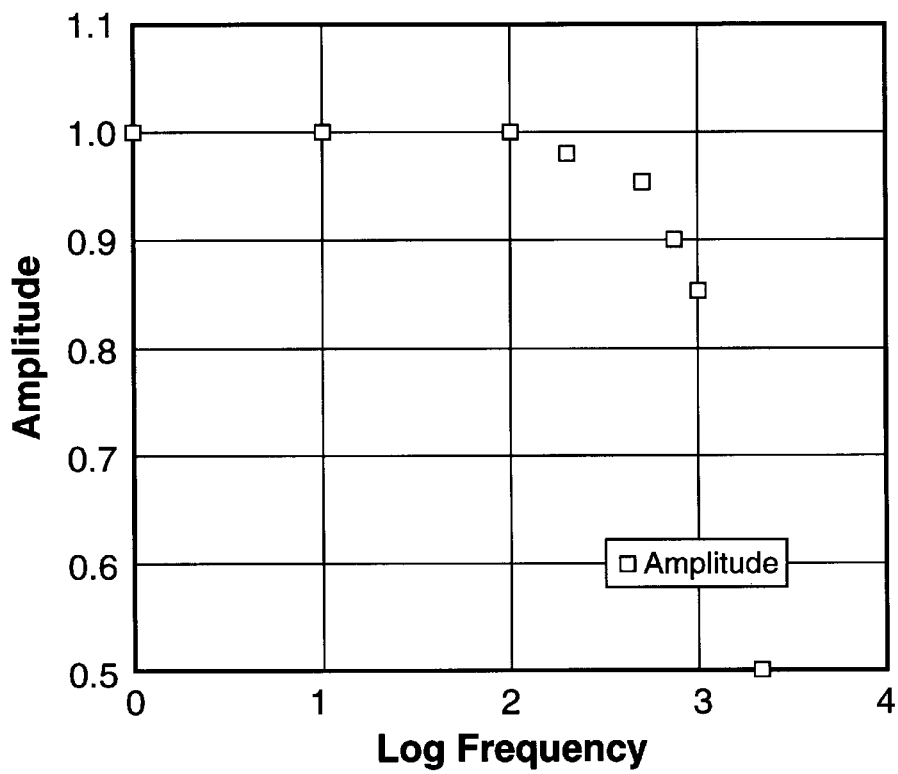
FIG. 6 is a graph showing the typical frequency response of an FLC window controlled by the apparatus shown in FIG. 3.
Figure 7:
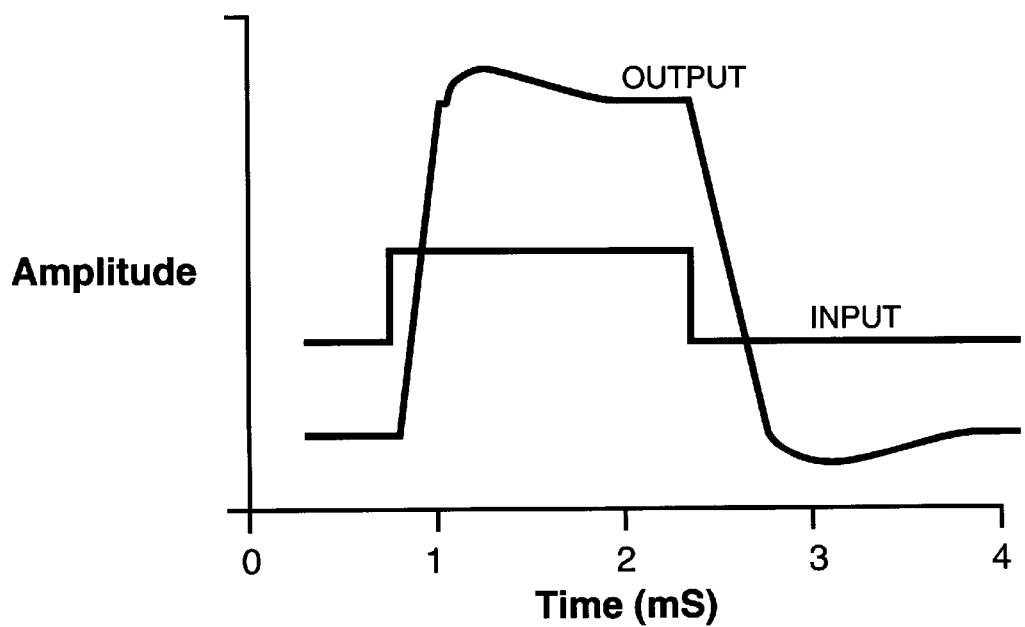
FIG. 7 is a graph showing the typical square wave response of an FLC window controlled by the apparatus shown in FIG. 3.

Note the simplified control circuitry of FIG. 3 as compared to the control circuitry shown in FIG. 1. Here, bi-phasic driver 22, bias oscillator 28, clock 32 and related circuitry have been eliminated. Note also that, in contrast to the conventional PWM method of control, the limit to the control scheme of the present invention is the discontinuous response across the FLC window as the open state is approached and the area of the window monitored by the feedback network begins to respond differently from other areas of the window. This can be seen in the linearity curve shown in FIG. 5. Approximately 0.5 log-units of modulation amplitude is lost which, added to the 0.6 log-units lost in the normal "on" state, results in a total light loss in the servo "on" state of about 1.1 log-units. However, the remaining predictable region provides over two log-units of modulation depth and the FLC window can be driven into the kilohertz range as can be seen in the frequency response curve shown in FIG. 6. The square wave response of the apparatus of FIG. 3 is shown in FIG. 7.

The FLC window embodiment has an operating temperature of about 16° C. to 26° C., while the LCW embodiment operates from about −10° C. to +55° C. If the limited operating temperature range can be maintained, the loss of approximately 1.1 log-units of the original light beam can be tolerated, and the order of magnitude cost difference is acceptable, then the FLC window embodiment provides a faster and simpler alternative to the LCW embodiment for temporal intensity modulation.

Accordingly, it will be seen that this invention provides a simple method and apparatus for transmitting a light signal through a liquid-crystal window, using the transmitted light as a feedback signal that is compared with the input control signal, and using the difference between the two signals for controlling the opacity of the liquid-crystal window. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for controlling the opacity of a liquid-crystal window, comprising:
    (a) a light emitter;
    (b) a light detector, said light detector substantially non-responsive to infrared radiation; and
    (c) drive signal means for generating a drive signal having a continuously variable amplitude and applying said drive signal to a liquid-crystal window to vary the opacity of said liquid-crystal window, said drive signal means including a phase lag component, said drive signal comprising the difference between an output signal from said light detector and an input control signal, said light detector being responsive to light transmitted from said light emitter through said liquid-crystal window.

2. An apparatus as recited in claim 1, further comprising a liquid-crystal window having variable states of opacity.

3. An apparatus as recited in claim 2, wherein said drive signal means comprises a differential amplifier, said differential amplifier having first and second inputs and an output, said first input electrically coupled to said light detector, said second input configured for receiving said input control signal, said output electrically coupled to said liquid-crystal window, and further comprising a bias oscillator electrically coupled to said second input.

4. An apparatus as recited in claim 1, further comprising bi-phasic driver means for continuously alternating between application of said drive signal and a ground potential to said liquid-crystal window at a frequency of approximately 500 Hz.

5. A servo-controlled liquid-crystal window, comprising:
  (a) a liquid-crystal window having first and second sides, said liquid-crystal window having variable states of opacity;
  (b) a light emitter positioned adjacent to said first side of said liquid-crystal window;
  (c) a light detector positioned adjacent to said second side of said liquid-crystal window and opposing said light emitter, said light detector substantially nonresponsive to infrared radiation, said light detector generating an output signal responsive to light transmitted through said liquid-crystal window from said light emitter; and
  (d) drive signal means for comparing said output signal to an input control signal and generating a differential signal, and for applying said differential signal to said liquid-crystal window to vary the opacity of said liquid-crystal window, said differential signal having a continuously variable amplitude, said drive signal means including a phase lag component.

6. An apparatus as recited in claim 5, further comprising bi-phasic driver means for continuously alternating between application of said drive signal and a ground potential to said liquid-crystal window at a frequency of approximately 500 Hz.

7. A servo-controlled liquid-crystal window as recited in claim 5, wherein said drive signal means comprises a differential amplifier, said differential amplifier having first and second inputs and an output, said first input electrically coupled to said light detector, said second input configured for receiving said input control signal, said output electrically coupled to said liquid-crystal window, and further comprising a bias oscillator electrically coupled to said second input.

8. A servo-controlled liquid-crystal window, comprising:
  (a) a liquid-crystal window having first and second sides, said liquid-crystal window having variable states of opacity;
  (b) a light emitter positioned adjacent to said first side of said liquid-crystal window;
  (c) a light detector positioned adjacent to said second side of said liquid-crystal window and opposing said light emitter, said light detector substantially nonresponsive to infrared radiation, said light detector emitting a feedback signal responsive to light transmitted through said liquid-crystal window from said light emitter; and
  (d) a differential amplifier, said differential amplifier having first and second inputs and an output, said first input electrically coupled to said light detector, said output electrically coupled to said liquid-crystal window, said differential amplifier including a phase lag component;
  (e) wherein said differential amplifier produces a drive signal having a continuously variable amplitude which is the difference between said feedback signal and an input signal coupled to said second input; and
  (f) a bias oscillator electrically coupled to said second input.

9. An apparatus as recited in claim 8, further comprising bi-phasic driver means for continuously alternating between application of said drive signal and a ground potential to said liquid-crystal window at a frequency of approximately 500 Hz.

10. A method for controlling the opacity of a liquid-crystal window, comprising the steps of:
  (a) positioning a light emitter adjacent to a first side of a liquid-crystal window having varying states of opacity;
  (b) positioning a light detector adjacent to a second side of said liquid-crystal window and opposing said light emitter, said light detector responsive to light transmitted through said liquid-crystal window from said light emitter, said light detector substantially nonresponsive to infrared radiation;
  (c) comparing an output signal from said light detector to an input control signal and generating a differential signal having a continuously variable amplitude; and
  (d) applying said differential signal to said liquid-crystal window to vary the opacity of said liquid-crystal window.

* * * * *